United States Patent [19]
Baker

[11] Patent Number: 6,122,613
[45] Date of Patent: *Sep. 19, 2000

[54] SPEECH RECOGNITION USING MULTIPLE RECOGNIZERS (SELECTIVELY) APPLIED TO THE SAME INPUT SAMPLE

[75] Inventor: James K. Baker, West Newton, Mass.

[73] Assignee: Dragon Systems, Inc., Newton, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/791,680

[22] Filed: Jan. 30, 1997

[51] Int. Cl.⁷ .................................................. G10L 15/26

[52] U.S. Cl. ........................................ 704/235; 704/252

[58] Field of Search .................................. 704/200, 235, 704/252, 231, 236, 251, 270, 277

[56] References Cited

U.S. PATENT DOCUMENTS

| | | | |
|---|---|---|---|
| 4,060,694 | 11/1977 | Suzuki et al. | 704/252 |
| 4,430,726 | 2/1984 | Kasday | 704/255 |
| 4,481,593 | 11/1984 | Bahler . | |
| 4,489,435 | 12/1984 | Moshier . | |
| 4,720,864 | 1/1988 | Tajima et al. | 381/43 |
| 4,783,803 | 11/1988 | Baker et al. . | |
| 4,803,729 | 2/1989 | Baker . | |
| 4,805,218 | 2/1989 | Bamberg et al. | 381/43 |
| 4,805,219 | 2/1989 | Baker et al. | 381/43 |
| 4,813,076 | 3/1989 | Miller | 381/43 |
| 4,829,576 | 5/1989 | Porter | 381/43 |
| 4,837,831 | 6/1989 | Gillick et al. . | |
| 4,866,778 | 9/1989 | Baker | 704/254 |

(List continued on next page.)

FOREIGN PATENT DOCUMENTS

| | | |
|---|---|---|
| 2 088 106 | 3/1982 | United Kingdom . |
| 2 303 955 | 5/1997 | United Kingdom . |
| 2 302 199 | 8/1997 | United Kingdom . |
| WO 95/24693 | 9/1995 | WIPO . |

OTHER PUBLICATIONS

IBM Technical Disclosure Bulletin, "Improved Correction of Speech Recognition Errors Through Audio Playback", vol. 36, No. 06A, Jun. 1993, 153–154.

(List continued on next page.)

*Primary Examiner*—David R. Hudspeth
*Assistant Examiner*—Donald L. Storm
*Attorney, Agent, or Firm*—Fish & Richardson P.C.

[57] ABSTRACT

A speech sample is recognized with a computer system by processing the speech sample with at least two speech recognizers, each of which has a different performance characteristic. One speech recognizer may be a large-vocabulary, continuous speech recognizer optimized for real-time responsiveness and another speech recognizer may be an offline recognizer optimized for high accuracy. The speech content of the sample is recognized based on processing results from the speech recognizers. The speaker is provided with a real-time, yet potentially error-laden, text display corresponding to the speech sample while, subsequently, a human transcriptionist may use recognition results from multiple recognizers to produce an essentially error-free transcription. The performance characteristics of the recognizers may be based on style or subject matter, and the recognizers may operate serially or in parallel. Sets of candidates produced by the two recognizers may be combined by merging the scores to generate a combined set of candidates that corresponds to the union of the two sets. Offline processing may be performed based on input from a human operator, cost, processing times, confidence levels, or importance. Uncertainty for a candidate may occur when a difference between a score for a best scoring candidate and a score for a second best scoring candidate is less than a threshold value. A graphic user interface may allow the user to selectively transmit the speech sample to an other speech recognizer (or restrict such transmission), based on document type or availability of the second speech recognizer.

51 Claims, 13 Drawing Sheets

U.S. PATENT DOCUMENTS

| | | |
|---|---|---|
| 4,931,950 | 6/1990 | Isle et al. ................................. 364/513 |
| 4,991,217 | 2/1991 | Garrett et al. ............................ 381/43 |
| 5,027,406 | 6/1991 | Roberts et al. . |
| 5,036,539 | 7/1991 | Wrench, Jr. et al. ..................... 381/43 |
| 5,127,055 | 6/1992 | Larkey et al. ........................... 704/244 |
| 5,202,952 | 4/1993 | Gillick et al. ............................... 395/2 |
| 5,208,897 | 5/1993 | Hutchins . |
| 5,231,670 | 7/1993 | Goldhor et al. .......................... 381/43 |
| 5,280,563 | 1/1994 | Ganong ....................................... 395/2 |
| 5,369,704 | 11/1994 | Bennett et al. ............................. 380/9 |
| 5,426,745 | 6/1995 | Baji et al. ................................ 395/375 |
| 5,428,707 | 6/1995 | Gould et al. . |
| 5,497,373 | 3/1996 | Hulen et al. .............................. 370/79 |
| 5,502,774 | 3/1996 | Bellegarda et al. .................... 382/159 |
| 5,515,475 | 5/1996 | Gupta et al. . |
| 5,519,808 | 5/1996 | Benton, Jr. et al. .................... 704/270 |
| 5,566,272 | 10/1996 | Brems et al. ........................... 704/231 |
| 5,666,400 | 9/1997 | McAllister et al. ................. 379/88.01 |
| 5,677,991 | 10/1997 | Hsu et al. ............................... 704/255 |
| 5,754,972 | 5/1998 | Baker et al. . |
| 5,799,273 | 8/1998 | Mitchell et al. . |
| 5,857,099 | 1/1999 | Mitchell et al. . |

OTHER PUBLICATIONS

Barry, Tim et al., "The Simultaneous Use of Three Machine Speech Recognition Systems to Increase Recognition Accuracy,"Proc. of the Nat'l Aerospace and Electronics Conf. NAEON 1994, vol. 2, pp. 667–671.

"Proofreading Aid for Speech Dictation Systems," IBM Technical Disclosure Bulletion, vol. 39, No. 1, (Jan. 1996), p. 149.

Rabiner, L.R., Levinson, S.E. and M.M. Sondhi. "On the application of vector quantization and hidden Markov models to speaker–independent, isolated word recognition", Bell System Technical Journal, vol. 62, No. 4, pt. 1, pp. 1075–1105, Apr. 1983.

Brown, M.K. and L.R. Rabiner. "On the use of energy in LPC–based recognition of isolated words", System Technical Journal, vol. 61, No. 10, pt. 1, pp. 2971–2987, Dec. 1982.

Alper, Alan. "IBM trumpets experimental speech recognition system", Computerworld, vol. 20, No. 16, p. 25 (2 pages), Apr. 21, 1986.

| | |
|---|---|
| C Word (1) | C Score (1) |
| C Word (2) | C Score (2) |
| ... | ... |
| C Word (k) | C Score (k) |

{ 608 }  { 610 }

COMBINED

FIG. 6C

| | |
|---|---|
| OL Word (1) | OL Score (1) |
| OL Word (2) | OL Score (2) |
| ... | ... |
| OL Word (j) | OL Score (j) |

{ 604 }  { 606 }

OFFLINE

FIG. 6B

| | |
|---|---|
| RT Word (1) | RT Score (1) |
| RT Word (2) | RT Score (2) |
| ... | ... |
| RT Word (i) | RT Score (i) |

{ 600 }  { 602 }

REAL-TIME

FIG. 6A

| 810 | 808 |
|---|---|
| 19.00 | patent |
| 45.75 | Patton |
| 51.75 | happened |
| 60.75 | batten |
| 61.75 | had |

COMBINED ($\lambda = .75$)

FIG. 8C

| 806 | 804 |
|---|---|
| 11 | patent |
| 47 | Patton |
| 51 | happened |
| 64 | had |

OFFLINE

FIG. 8B

| 802 | 800 |
|---|---|
| 42 | Patton |
| 43 | patent |
| 48 | batten |
| 54 | happened |

REAL-TIME

FIG. 8A

SPEECH RECOGNITION USING MULTIPLE RECOGNIZERS (SELECTIVELY) APPLIED TO THE SAME INPUT SAMPLE

BACKGROUND

The invention relates to speech recognition.

A speech recognition system analyzes a person's speech to determine what the person said. Most speech recognition systems are frame-based. In a frame-based system, a processor divides a signal descriptive of the speech to be recognized into a series of digital frames, each of which corresponds to a small time increment of the speech. The processor then compares the digital frames to a set of speech models. Each speech model may represent a word from a vocabulary of words, and may represent how that word is spoken by a variety of speakers. A speech model also may represent a sound, or phoneme, that corresponds to a portion of a word. Collectively, the constituent phonemes for a word in the model represent the phonetic spelling of the word.

The processor determines what the speaker said by finding the speech models that best match the digital frames that represent the person's speech. The words or phrases corresponding to the best matching speech models are referred to as recognition candidates. Speech recognition is discussed in U.S. Pat. No. 4,805,218, entitled "METHOD FOR SPEECH ANALYSIS AND SPEECH RECOGNITION," which is incorporated by reference.

FIG. 1 is a block diagram of a system that may be used for speech recognition. The system includes various input/output (I/O) devices (microphone 101, mouse 103, keyboard 105, display 107) and a general purpose computer 100 having a central processor unit (CPU) 121, an I/O unit 117 and a sound card 119. A memory 109 stores data and various programs such as an operating system 111, an application program 113 (e.g., a word processing program), and a speech recognition program 115.

The microphone 101 detects utterances from a speaker and conveys the utterances, in the form of an analog signal, to sound card 119, which in turn passes the signal through an analog-to-digital (A/D) converter to transform the analog signal into a set of digital samples. Under control of the operating system 111, the speech recognition program 115 compares the digital samples to speech models to determine what the speaker said. The results of this determination may be stored for later use or may be used as input to the application program 113.

As shown in FIG. 2, the speech recognition program may run concurrently with an application program—for example, a word processor—to allow the speaker to use the microphone 101 as a text input device either alone or in conjunction with the keyboard 105 and mouse 103. The speaker interacts with the word processor through a graphic user interface (GUI) which includes a window 200 having a text field 202. The speech recognition program also employs a GUI to communicate with the speaker. The GUI shown in FIG. 2 was developed by Dragon Systems, Inc. for the speech recognition program, DragonDictate® for Windows®. In FIG. 2, the speech recognition program's GUI is superimposed on the word processor's GUI to provide the speaker with convenient access to both programs.

In the example shown, the speaker has spoken the Preamble of the U.S. Constitution into the microphone. The spoken words are recognized by the speech recognition program and provided as input to the word processor which then displays the corresponding text into the text field 202. In this example, however, the spoken word "States" was recognized incorrectly as "stakes" 208. Using appropriate voice commands (either alone or in conjunction with input from the keyboard or mouse), the speaker may correct the text, for example by designating the second word choice 210, "States," in the word history window 206 as being the correct word.

A speech recognition system may be a "discrete" system—i.e., one which recognizes discrete words or phrases but which requires the speaker to pause briefly between each discrete word or phrase spoken. Alternatively, a speech recognition system may be "continuous," meaning that the recognition software can recognize spoken words or phrases regardless of whether the speaker pauses between them. Continuous speech recognition systems typically have a higher incidence of recognition errors in comparison to discrete recognition systems due to complexities of recognizing continuous speech. A more detailed description of continuous speech recognition is provided in U.S. Pat. No. 5,202,952, entitled "LARGE-VOCABULARY CONTINUOUS SPEECH PREFILTERING AND PROCESSING SYSTEM," which is incorporated by reference.

SUMMARY

In one aspect, a speech sample is recognized with a computer system by processing the speech sample with at least two speech recognizors, each of which has a different performance characteristic. The different performance characteristics may complement each other. For example, one speech recognizor may be optimized for real-time responsiveness and the other speech recognizor may be optimized for high accuracy. The speech content of the speech sample is recognized based on processing results from multiple speech recognizors. The speaker is provided with a real-time, yet potentially error-laden, text display corresponding to the speech sample, while subsequently a human transcriptionist may use recognition results from the two recognizors to produce an essentially error-free transcription. The recognizors may be optimized for various characteristics other than real-time responsiveness and high accuracy, for example, based on different writing styles or different subject matters.

One or more of the recognizors may be capable of recognizing speech on a continuous basis. The high accuracy recognizor may be a large vocabulary continuous speech recognizor that executes offline. The respective speech recognition analyses by the two recognizors may be performed serially or in parallel.

In one embodiment, the first speech recognizor identifies a first set of candidates that likely match the speech sample and calculates a corresponding first set of scores. Similarly, the second speech recognizor identifies a second set of candidates that likely match the speech sample and calculates a corresponding second set of scores. The scores calculated by the first and second recognizors are based on a likelihood of matching the speech sample.

The first and second sets of candidates are combined, for example, by taking their union to generate a combined set of candidates. The first and second sets of scores are merged to generate a combined set of scores, for example, by calculating a weighted average for each corresponding pair of scores. The combined sets of candidates are presented to a transcriptionist in an order of priority determined by the candidates' respective combined scores. The transcriptionist may use this information to correct any recognition errors that are present in the recognized text. Speech models used by the recognizors in performing recognition analysis may be adapted based on the feedback from the transcriptionist about whether the speech content was correctly recognized.

The scores may be used to determine whether any recognition uncertainties are present in the recognizors' respective results. A recognition uncertainty is indicated when either of the recognizors is uncertain (i.e., a difference between scores associated with a recognizor's best and second-best candidates is less than a threshold value) or when the two recognizors disagree. Any detected recognition uncertainties may be used to flag portions of the speech sample for the transcriptionist as warranting special attention.

The nature and extent of offline processing (e.g., offline recognition, error-correction by a transcriptionist) that is to be performed on a speech sample may be controlled by a user of the computer system with a graphic user interface (GUI) or automatically based on predetermined criteria. The user manually may choose whether, and to what extent, offline processing of the speech sample should occur. The predetermined criteria used to control offline processing may include costs, processing times or availabilities associated with the offline processing, an importance level of the particular speech sample under consideration, or a confidence level associated with the recognition results from online processing.

Advantages of this invention may include one or more of the following. A synergy is realized by a speech recognition system that uses multiple speech recognizors having complementary properties. Optimizing one of the speech recognizors (a "real-time" recognizor) for real-time interactivity provides the speaker with immediate visual feedback and the ability to make online corrections to the recognized speech. This makes the dictation process more intuitive and more efficient. Combining the real-time speech recognition results with the results from another speech recognizor that is optimized for high accuracy (an "offline" recognizor) provides final speech recognition results that are likely to be more accurate. Combining the recognition results from two recognizors based on weighting factors allows the speech recognition system to accord greater weight to the recognition result from the recognizor known to be more accurate. Moreover, the use of multiple stages of speech recognition processing—i.e., real-time recognition, offline recognition and offline transcription—drastically reduces the recognition error rate.

A multiple-recognizor speech recognition system offers several advantages over a single recognizor system. First, an increased number of recognizors tends to increase the number of resulting recognition candidates for a given speech sample. This larger assortment of candidates, which is more likely to contain the correct choice, provides more information to a human transcriptionist or system user. In addition, a multiple recognizor system has an increased capability to identify instances of recognition uncertainty. The likelihood that a recognition result is incorrect is greater if the recognizors disagree about the recognition of a given utterance, or if either or both of the recognizors are uncertain of the accuracy of their respective recognition results. These instances of uncertainty may be highlighted for the transcriptionist or system user.

Modularizing the various speech recognition processes provides the speaker with a high degree of flexibility. The speaker may choose to have no offline processing performed on dictated documents of an informal nature (e.g., an e-mail messages) or the speaker may choose to have extensive offline processing performed on an important dictated document (e.g., a contract). Various intermediate levels of offline processing also can be made available to the speaker. Similarly, system administrators of speech recognition systems are better able to manage resources and control processing costs by setting criteria that limit the nature and extent of offline processing that may be performed.

The modularization and distribution of the speech recognition processes also realizes certain benefits such as enhanced information hiding, increased efficiency, and the increased ability to outsource one or more of the processes. For example, because the offline transcription process is separated from the other processes, it may be contracted out to a company that specializes in transcription services. Furthermore, because the offline transcriptionist's function is limited to correcting recognition errors (as opposed to making editorial changes to the text), the transcriptionist's changes may be used to train the recognizors' speech models without fear that the models will be corrupted.

Other features and advantages will become apparent from the following description, including the drawings and the claims.

BRIEF DESCRIPTION OF THE DRAWINGS

FIGS. 6A, 6B and 6C are data diagrams of the information that is passed between components in FIG. 5.

FIGS. 8A, 8B and 8C are example data tables for the speech sample illustrated in FIG. 3.

DETAILED DESCRIPTION

Figure 10:
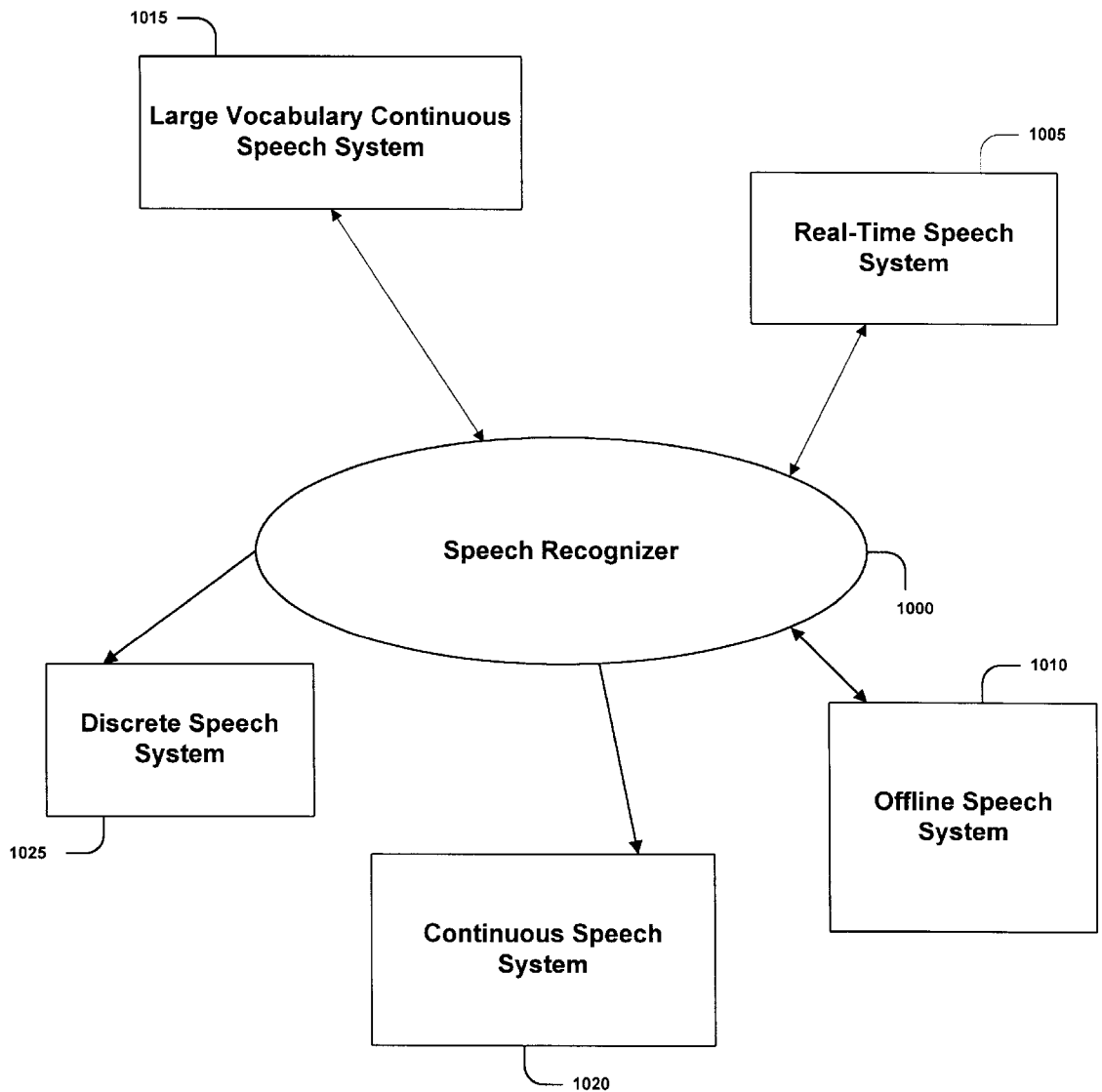
FIG. 10 is a diagram showing types of speech recognizors.

Referring to FIG. 10, when a speech recognition system 1005 is used for dictation, the speech recognition system serves as an alternative to other input mechanisms such as a keyboard. A user who is unable or who does not like to type on a keyboard nonetheless may create a written document by orally dictating the text into the microphone of a speech recognition system 1005. In a "real-time" recognition system, the speaker's words are, from the speaker's perspective, recognized and the corresponding text is displayed on a computer display screen essentially at the same time as the words are spoken.

Real-time speech recognition has the advantage of interactivity. The speaker is provided with essentially immediate visual feedback of the dictation stream for quick and easy review of the text. This allows the speaker to refresh his or her memory if the dictation stream is interrupted and to perform "online" revisions—that is, to revise the document while it is being created. DragonDictate® is an example of a real-time recognition system.

In contrast to real-time systems, an "offline" system 1010 typically does not recognize speech on a real-time basis but rather, due to processing speed constraints, requires a greater amount of time to perform speech recognition. An example of offline dictation is when the speaker's words are recorded, either by a tape recorder or by a human stenographer, and then typed up by a human transcriptionist at a later time.

Computer-based offline recognition may be implemented with a software recognition engine (i.e., a "recognizor") that performs sophisticated and extensive analysis of a speech sample to determine the speech content of the sample with a high degree of accuracy. An example of a high-performance offline recognizor is the Hidden Markov Model Tool Kit ("HTK") developed by the Entropic Cambridge Research Laboratory and described in Steve Young et al., "The HTK Book," Cambridge University Technical Services Ltd. (December 1995), which is incorporated by reference. HTK is a large vocabulary continuous speech recognizor ("LVCSR") 1015 that uses hidden Markov model techniques to recognize speech with a high degree of accuracy. The hidden Markov model technique is discussed in U.S. Pat. No. 5,027,406, which is incorporated by reference.

Offline recognizors are able to recognize speech with a degree of accuracy considerably higher than that of real-time recognizors because offline recognizors generally are not subject to time and display constraints that limit the nature of the recognition algorithm that may be applied to the speech sample. For example, an offline recognizor may use a recognition algorithm that requires several passes over a series of words before the words are recognized. In contrast, a real-time recognizor must, by definition, complete the recognition analysis within a time period sufficiently small that the speaker experiences no undue delay between the utterance of speech and the appearance of text on the display screen. Accordingly, real-time recognizors typically recognize speech with a degree of accuracy considerably lower than offline recognizors because real-time recognizors are time constrained in the amount and nature of recognition processing that may be performed for a given speech sample. This is particularly true for continuous speech recognition 1020 which requires more extensive analysis than discrete recognition 1025 to reach an accurate result.

Figure 11:
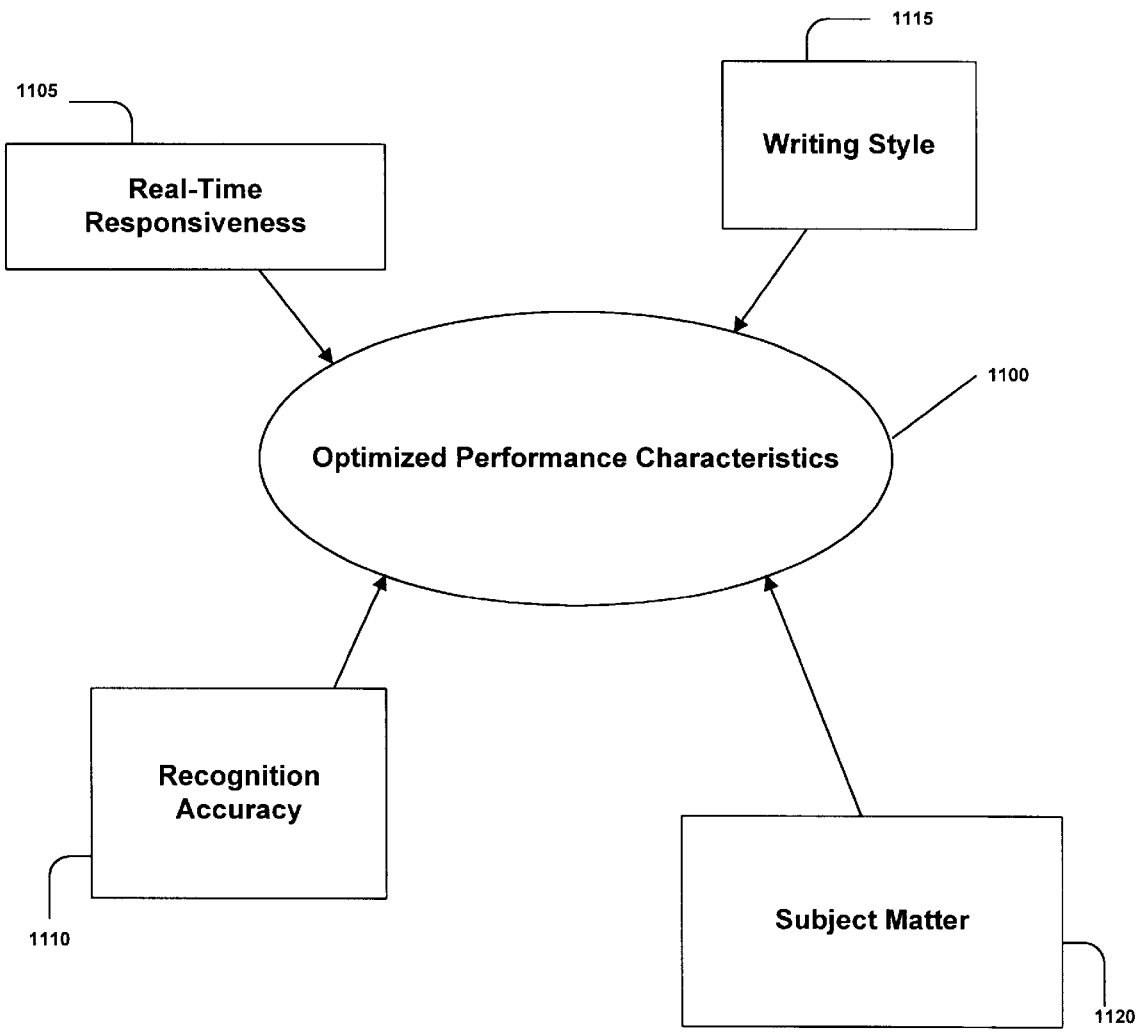
FIG. 11 is a diagram showing types of performance characteristics that can be optimized.

Speech recognition systems traditionally have used a single recognizor that is tailored to achieve a desired balance between several competing factors such as interactivity (i.e., real-time responsiveness) and accuracy. A speech recognition system that exhibits real-time responsiveness may do so by sacrificing high accuracy and vice versa. The speech recognition system of FIG. 3, however, provides both real-time responsiveness and a high degree of accuracy by employing at least two recognizors, each optimized for a different characteristic 1100, as shown in FIG. 11. In one implementation, one recognizor is optimized for real-time responsiveness 1105 the expense of accuracy and a second recognizor is optimized for high accuracy 1110 at the expense of interactivity.

Figure 1:
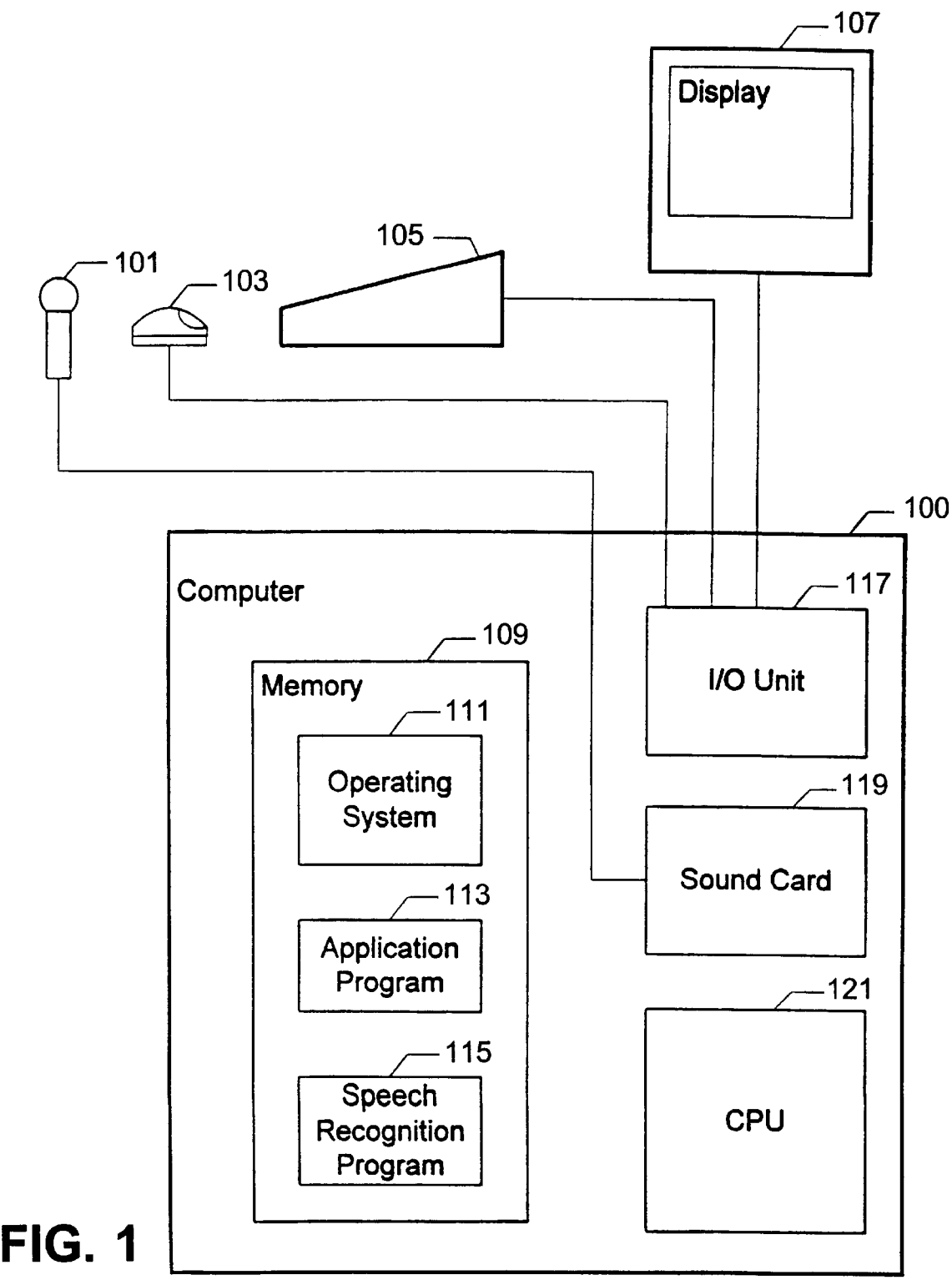
FIG. 1 is a block diagram of a speech recognition system.
Figure 2:
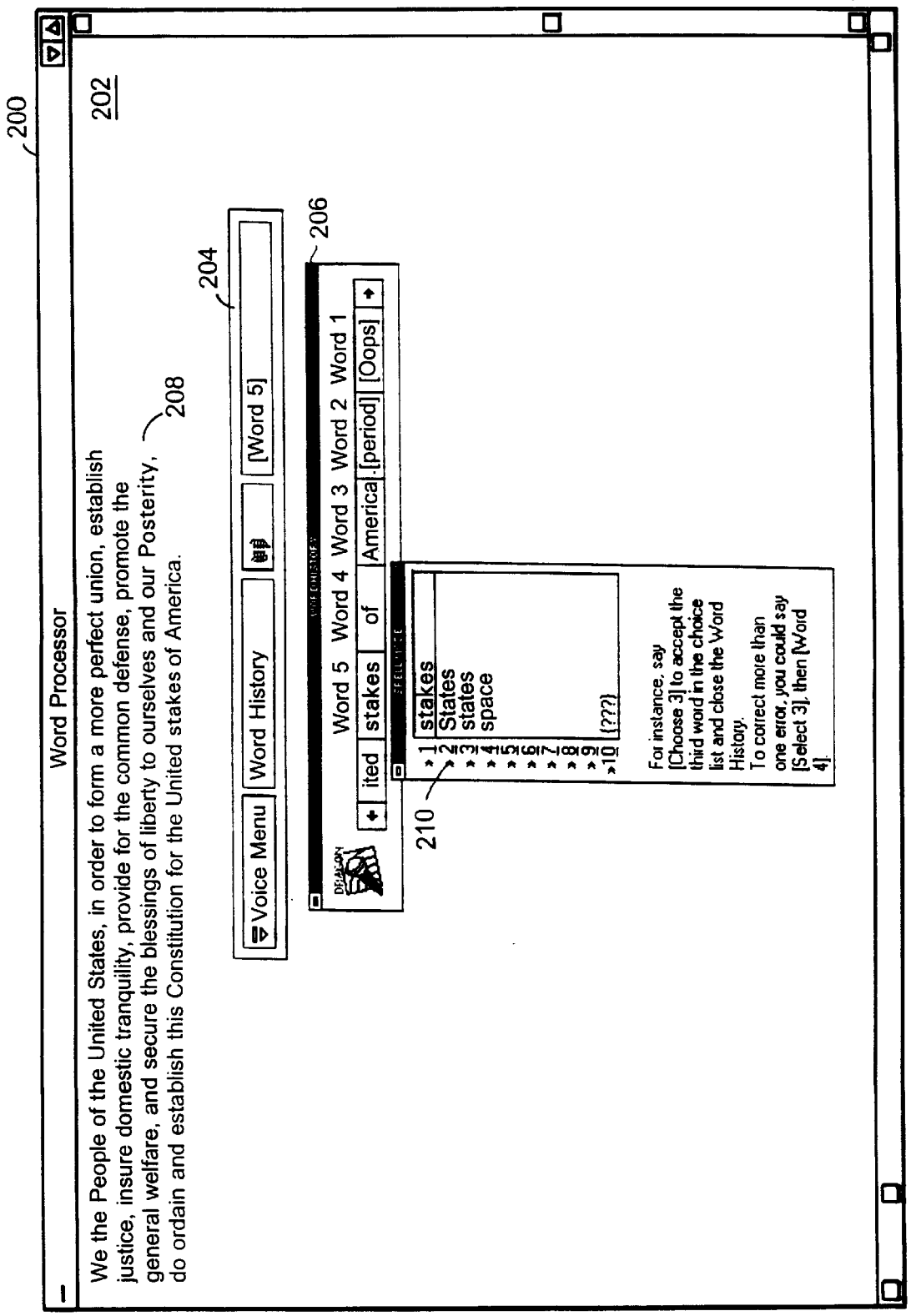
FIG. 2 is an example screen display of a speech recognition program being used to input text to a word processing program running on the system of FIG. 1.
Figure 3:
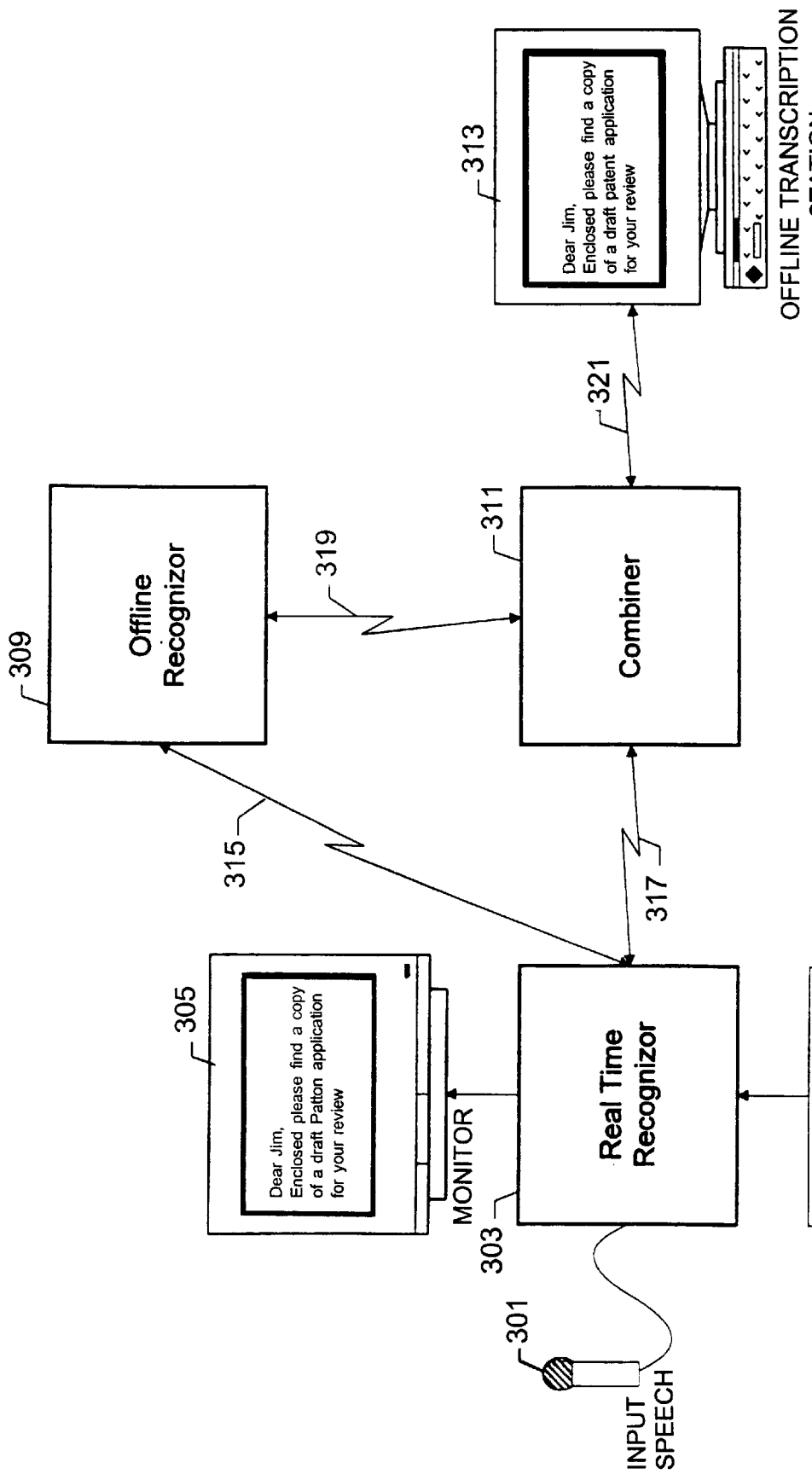
FIG. 3 is a block diagram of a speech recognition system having two recognizors.

As shown in FIG. 3, a microphone 301 detects a speech sample from a speaker and delivers the sample to a real-time recognizor 303. Typically, the real-time recognizor 303 will be a continuous speech recognition system or a discrete speech recognition system similar to the recognition system shown in FIG. 1 and will have a GUI similar to that shown in FIG. 2 to facilitate interaction with the speaker. The recognizor 303 performs real-time speech recognition on the speech sample and provides the recognized text to a monitor 305. Due to the complexities of continuous, real-time speech recognition, however, the recognized text on monitor 305 may contain one or more recognition errors. The speaker optionally may correct any such errors by entering corrections 307 either with voice commands through the microphone 301 or with another input device (e.g., a keyboard or a mouse).

After the real-time recognizor 303 has performed the recognition analysis, the speech sample optionally may be communicated to the offline recognizor 309 and to a combiner 311 (e.g., a computer or other processor executing various software processes) via communication links 315 and 317 respectively. The real-time recognizor 303 also sends the real-time recognition results (i.e., the speech content of the speech sample as recognized by the real-time recognizor 303) to the combiner 311. In one implementation, voice commands included in the speech sample are dealt with locally by the real-time recognizor (for example, by substituting the text equivalent of the voice command "new paragraph") and are not be sent to the offline recognizor or combiner. However, other implementations may send the voice commands to the offline recognizor, the combiner and/or the offline transcription station.

Upon receiving the speech sample, the offline recognizor 309 performs an independent recognition analysis, for example, using a LVCSR recognizor such as the HTK system, and communicates the recognition results (i.e., the speech content of the speech sample as recognized by the offline recognizor 309) to the combiner 311 using a communication link 319. Upon receiving both sets of recognition results, the combiner 311 processes the results by generating a combined set of recognition results and by checking for instances of uncertainty by one or both of the recognizors or discrepancies between the results produced by the two recognizors. The combiner 311 communicates the speech sample and the combined set of recognition results, including information that identifies instances of recognition uncertainty or disagreement, to the offline transcription station 313 via communication link 321. A human operator at the offline transcription station 313 selectively uses the speech sample (e.g., by listening to designated portions of it) and the input from the combiner 311 to generate an essentially error-free transcription of the speech sample. Alternatively, the combiner may return the combined results to the speaker by electronic mail or other means.

In one implementation, a single hardware platform (e.g., the speaker's workstation) handles real-time recognition and the corresponding real-time display of the recognized speech, as well as the reception of input speech and corrections from the speaker, while offline recognition, the functions performed by the combiner, and the functions handled at the transcription station each reside on a different platform. For example, the real-time recognition components (301, 303, 305, 307) may be resident on the speaker's workstation, the combiner may be resident on a server networked to the speaker's workstation, and the offline recognizor may be resident on a high-speed platform (e.g., a mini-supercomputer) located offsite. The offline transcription station also may be offsite, perhaps at a separate company contracted to provide transcription services.

In another implementation, any two or more (potentially all) of the components in FIG. 3 may reside on a single platform. For example, a high performance, multi-tasking workstation could have separate software processes running concurrently for real-time recognition (including real-time display of the recognition results and online correction by the speaker), offline recognition, and the combination and offline transcription of the combined recognition results. The speaker would be provided with real-time feedback, most likely containing a few errors due to mistaken recognition, by the real-time recognizor process. The speech sample also would be provided to the offline recognition process which would be running concurrently in the background and which would perform an independent recognition analysis. Once the offline process had completed, the offline recognition results could be combined with the real-time recognition results and used by the speaker in a separate transcription process to produce an essentially error-free transcription.

Although the speech recognition system of FIG. 3 uses two recognizors, other embodiments could employ three or more recognizors, each optimized for a different property. Referring again to FIG. 11, the recognizors (whether two or more in number) may be optimized for properties other than real-time responsiveness and high accuracy, for example, for different writing styles 1115 or for different subject matters 1120. Depending on the goals of the system designer, the optimized properties may, but need not be, complementary to one another.

A writing-style optimized system designed for use by a lawyer, for example, could have one speech recognizor optimized for recognizing utterances (e.g., words or voice commands) typically used in formal correspondence with clients, another recognizor optimized for recognizing utterances typically used in legally operative documents such as contracts or wills, and yet another recognizor optimized for recognizing utterances used in recording billing entries. As an example of optimization based on subject matter, a speech recognition system designed for use by a medical doctor could optimize each of the multiple recognizors for a different medical discipline—for example, one speech recognizor optimized for recognizing utterances typically used in pediatrics and another speech recognizor optimized for recognizing utterances typically used in immunology.

A more detailed description of the speech recognition process performed by the system of FIG. 3 is set forth with reference to the flowchart of FIG. 4. First, dictation by the speaker is picked up by the microphone, digitized by an A/D converter and provided to the real-time recognizor (step 400) which performs real-time continuous speech recognition on the speech sample (step 402).

The real-time recognition results, potentially containing one or more recognition errors, are displayed in real time on a monitor coupled to the real-time recognizer (step 404). The speaker optionally may perform online correction of any recognition errors using voice commands (e.g., by spelling out the correct word or by re-pronouncing it), by typing the correct word with the keyboard, or by manipulating the mouse to select the correct word from a list of word choices maintained by the real-time recognition system (step 406). In addition to correcting recognition errors, the speaker may at this point choose to rewrite portions of the recognized text.

Figure 12:
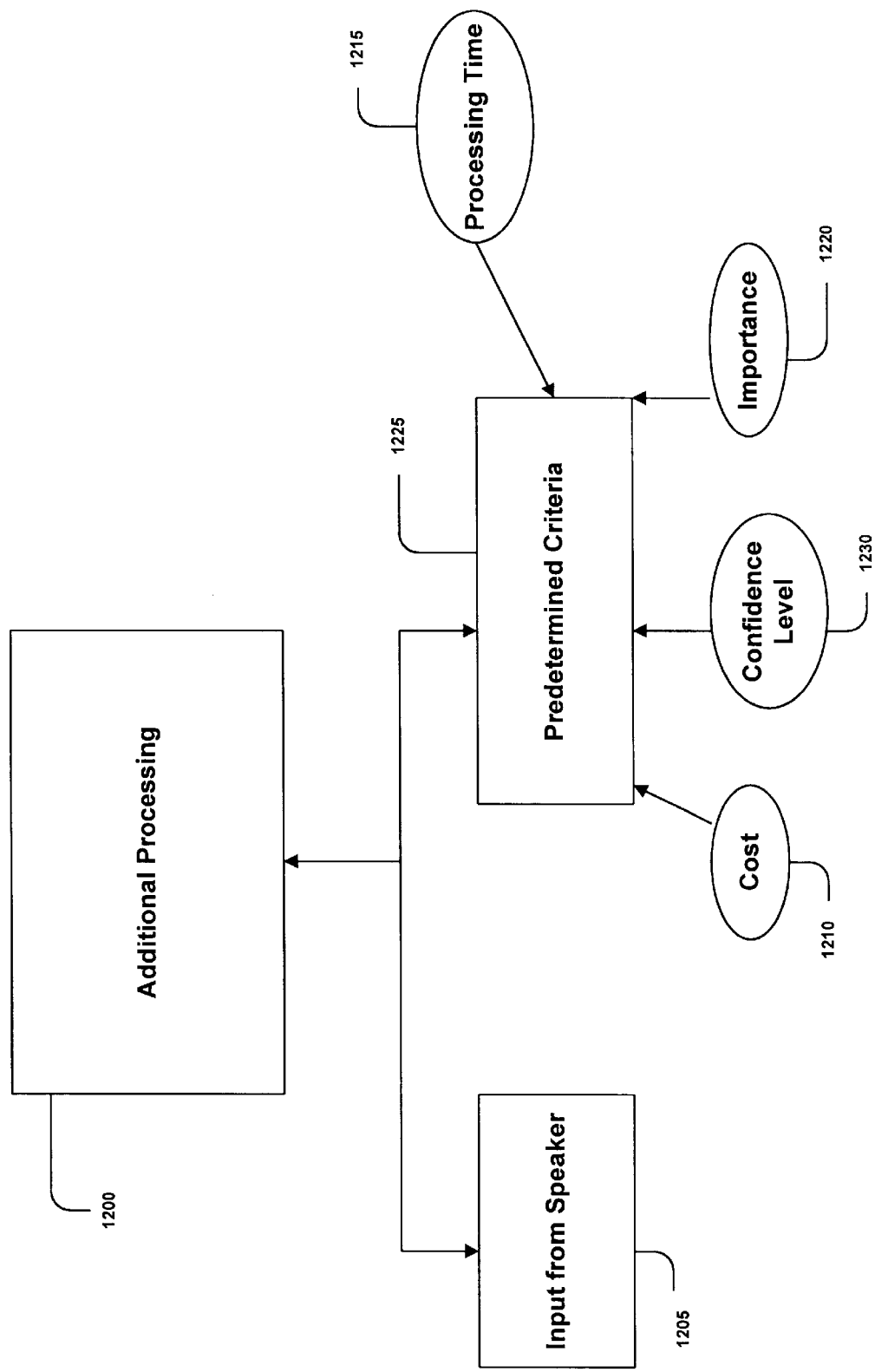
FIG. 12 is a diagram showing the decision to perform offline processing.

Referring also to FIG. 12, after the real-time recognition has completed (alternatively, while the real-time recognizor is still operating), the speaker may choose to have the speech sample processed further 1200, for example, to correct any errors that may have occurred during real-time recognition or to change the format or appearance of the resulting document. To this end, the system may prompt the user as to whether the user wants to send the sample for offline processing or to a transcriptionist 1205. Typically, a speaker who has dictated an informal document (e.g., an e-mail message to a friend) will choose not to incur the additional time, processor usage and potential expense of performing offline processing on the document. In contrast, a speaker who has dictated a formal document (e.g., a business letter or a contract) is more likely to send the document for offline processing to ensure that the document is error-free and properly formatted.

Depending on the speaker's preferences, the speech sample may be sent to the offline recognizor for an independent (and typically higher accuracy) speech recognition analysis (step 408). If so, offline speech recognition is performed (step 410) and both the real-time recognition results and the offline recognition results are sent to the combiner to be processed (step 412).

Figure 5:
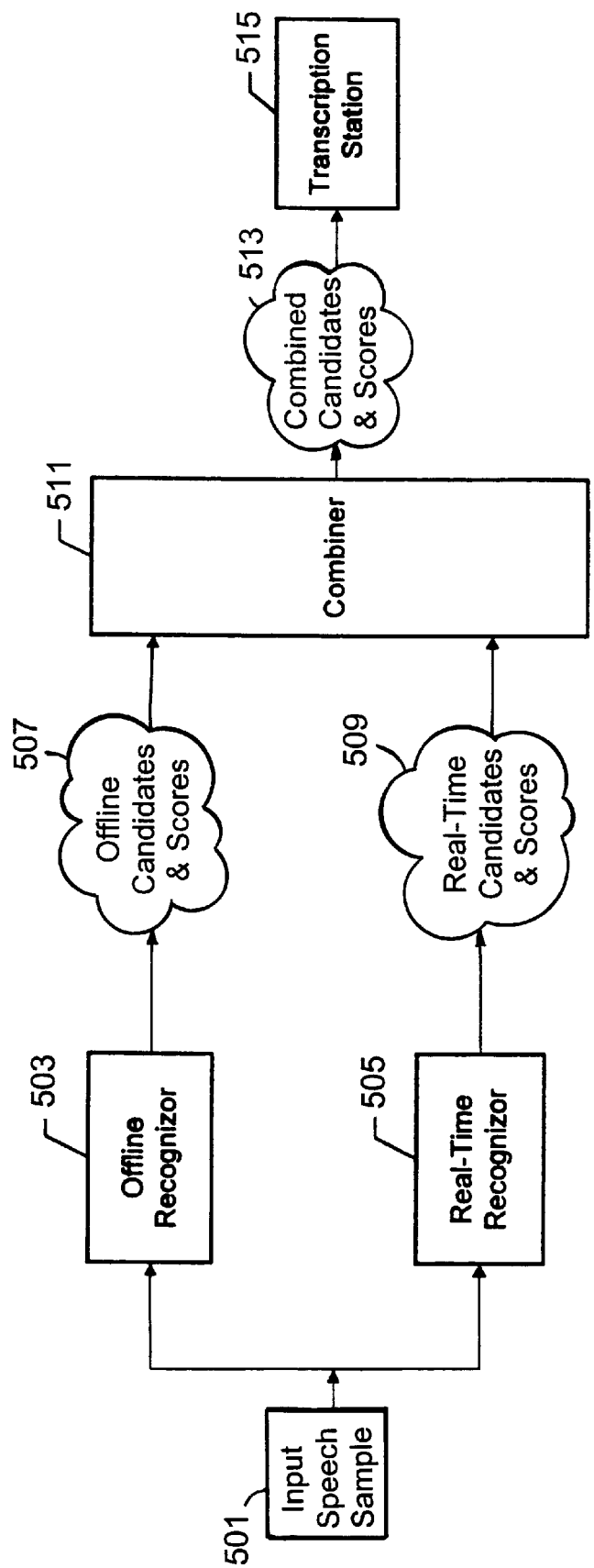
FIG. 5 is a block diagram of information flow in the speech recognition system of FIG. 3.

As shown in FIG. 5, the offline recognizor 503 and the real-time recognizor 505 generate separate sets of likely candidates—i.e., phrases, words, phonemes or other speech units that likely match a corresponding portion of the input speech—and associated scores for each of the candidates. Scores typically are maintained as negative logarithmic values for ease of processing. Accordingly, a lower score indicates a better match (a higher probability) while a higher score indicates a less likely match (a lower probability), with the likelihood of the match decreasing as the score increases.

FIGS. 6A and 6B show formats of recognition results tables that may be used by the real-time recognizor (FIG. 6A) and the offline recognizor (FIG. 6B). For each individual speech unit (e.g., phrase, word, phoneme) in the speech sample, each recognizor generates a data table having entries with a candidate in one field 600, 604 and the candidates' score in an adjacent field 602, 606. The number of candidates that are included in the data table is a matter of design choice but typically will be in the range of 2 to 4. The recognizors' tables of candidates and scores are sent to the combiner 511. The combiner then generates its own recognition results table for each unit of input speech, as shown in FIG. 6C, by determining the union of the real-time recognition candidates and the offline recognition candidates. Accordingly, each of the combiner's tables will contain as many or more candidates than the larger of the two recognizors' corresponding tables. The corresponding scores for the candidates in the combiner's tables are generated by using the following equation to calculate a weighted average of the real-time and offline scores:

$$S_c(w) = \lambda \cdot S_o(w) + (1-\lambda) \cdot S_r(w)$$

where w is the candidate under consideration, $S_c(w)$ is the combined score for candidate w, $S_o(w)$ is the offline recognizor's score for candidate w, $S_r(w)$ is the real-time recognizor's score for candidate w, and $\lambda$ is a weighting factor in the range of 0 to 1, inclusive, which is determined empirically.

If the user has indicated that a transcriptionist is to be used (step 414), the tables of combined candidates and scores are sent to the offline transcriptionist who uses this information to correct any recognition errors (step 416). The offline transcriptionist also may receive the raw speech sample, in the form of a digital data packet, from the real-time recognizor. The offline transcription station is able to randomly access and play back any portion (or all) of the speech sample in response to a request from the transcriptionist.

Figure 9:
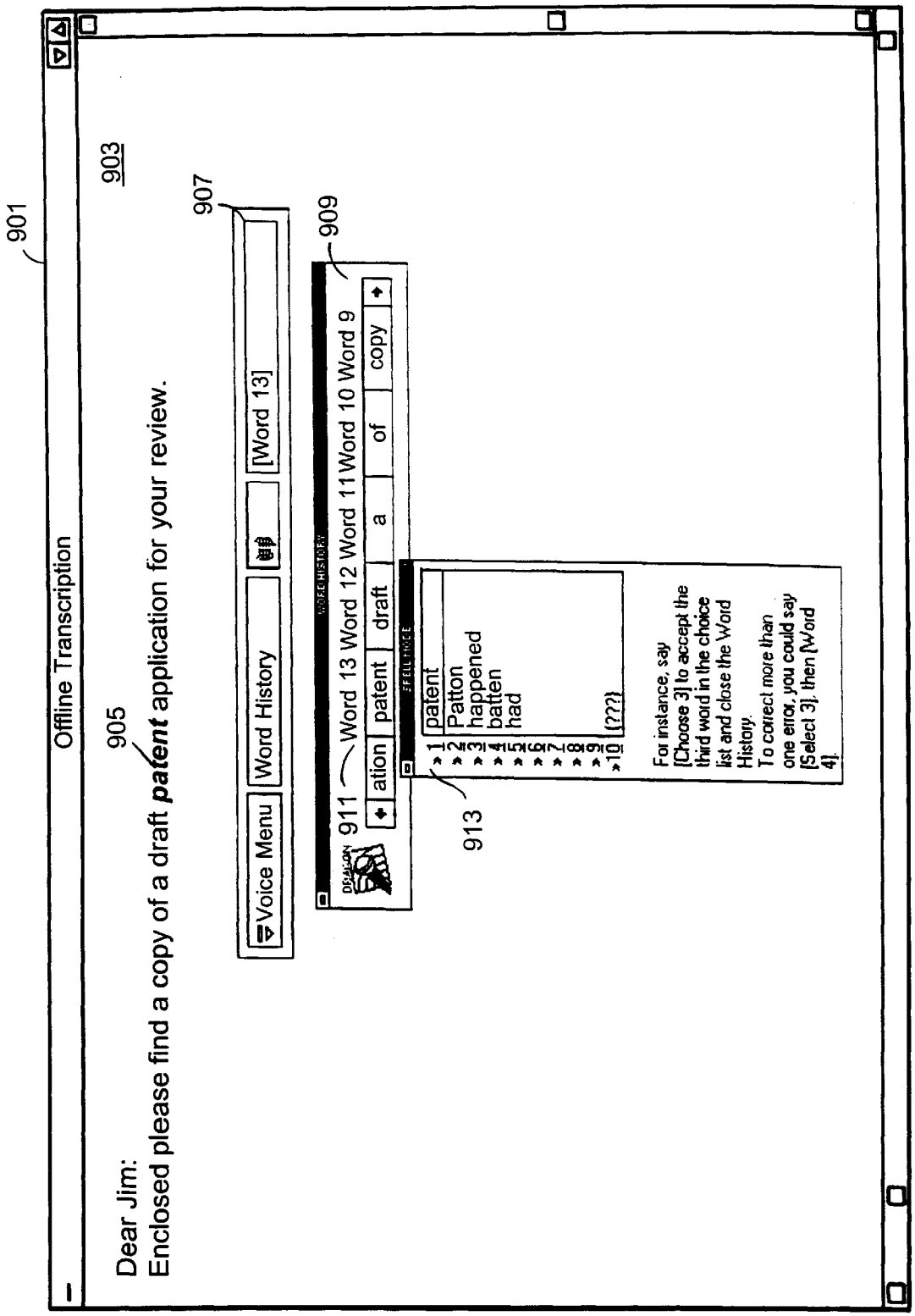
FIG. 9 is an example screen display of a graphic user interface used by the offline transcription station in the speech recognition system of FIG. 3.

As shown in FIG. 9, the offline transcription station may support a GUI 901 similar to that used by the real-time recognizor by which the transcriptionist is presented with the text of the speech sample in its current state of recognition. In addition, a word choice list 909 pops up on command for each word in the text and includes the candidates from the real-time recognizor and from the offline recognizor. The order of candidates in the word choice list corresponds to the combined scores calculated in step 412— i.e., the candidate with the lowest combined score is listed first, the candidate with the second lowest combined score is listed second, and so on for all of the candidates. The transcriptionist can evaluate each of the candidates, for example, by examining the context in which the speech unit under consideration appears or by listening to the portion of the speech sample that corresponds to, or surrounds, that speech unit. A candidate in the word choice list may be selected using the mouse or by issuing an appropriate voice command (e.g., "choose 1").

Corrections by the human transcriptionist optionally may be used to adapt, or train, the speech models employed by the offline recognizor or the real-time recognizor or both (step 418), assuming the human transcriptionist is constrained to only correct recognition errors and is not allowed to otherwise edit the document. For example, assume that the offline transcriptionist changed the word "presume" to "assume" because the transcriptionist felt that "assume" had been used by the speaker incorrectly. Using this change as the basis for training would result in an incorrect adaptation of the speech models and potentially could corrupt them. In effect, the speech models would thereafter be more likely to incorrectly hypothesize "presume" as the most likely candidate in response to an utterance of the word "assume." For that reason, any online changes to the recognized text made by the speaker at the real-time recognizor stage (step 406 in FIG. 4) should not be used to adapt the speech models because any such changes are likely to include different words or other revisions by the speaker, rather than just recognition error corrections. The training of speech models is discussed in more detail in U.S. Pat. No. 5,027,406, entitled "METHOD FOR INTERACTIVE SPEECH RECOGNITION AND TRAINING," which is incorporated by reference.

If the speaker chooses not to have offline speech recognition performed on the speech sample, the speaker nonetheless may choose to have the real-time recognition results sent to the offline transcription station for corrections by a human transcriptionist as described above (step 414). Alternatively, the speaker may choose not to have any offline processing performed on the document. In any event, the finished document is output in the desired format, for example, by printing it in hardcopy form or saving it to a data file (step 420).

Figure 4:
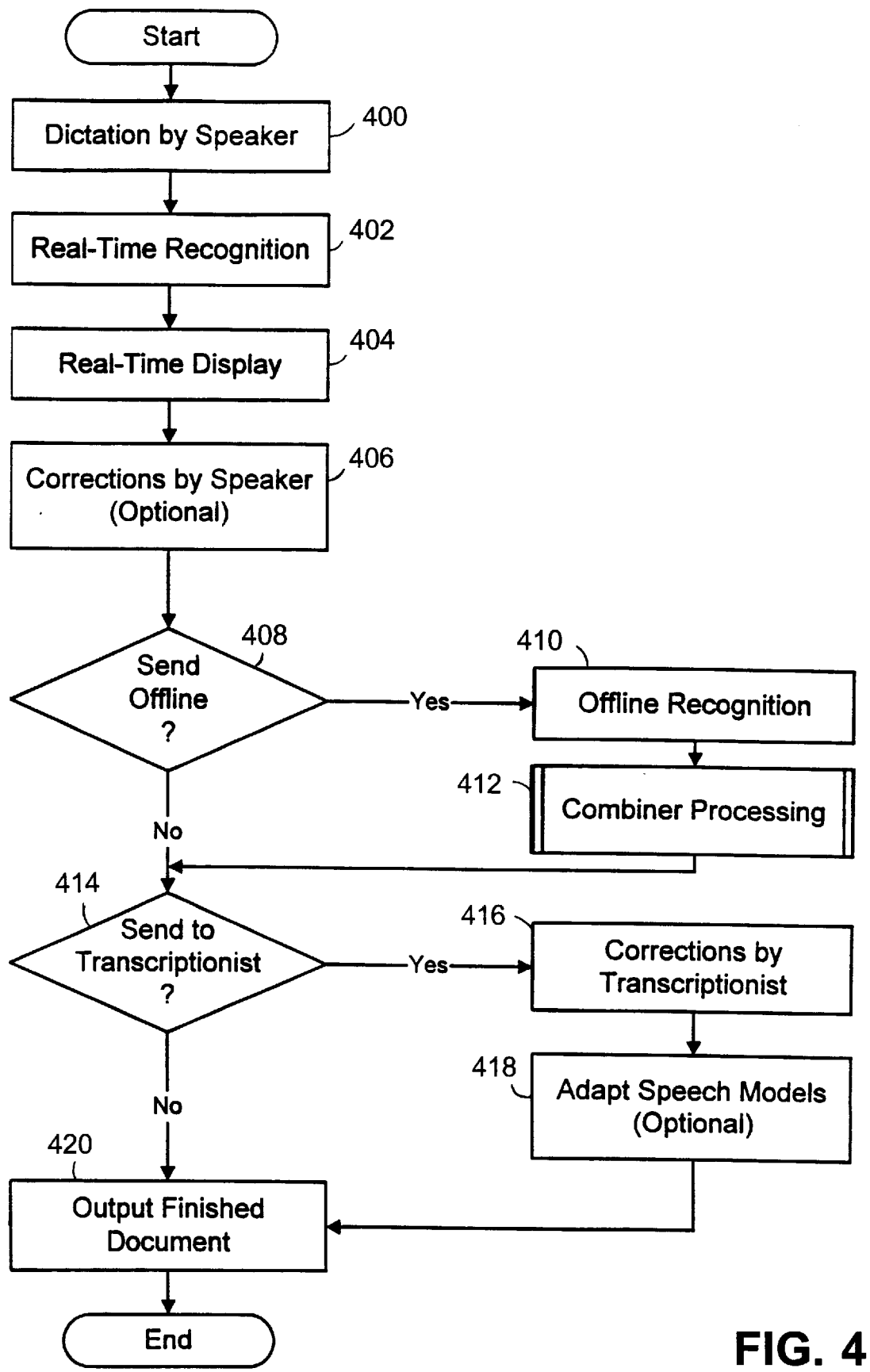
FIG. 4 is a flowchart of speech recognition using the two recognizor configuration of FIG. 3.

In steps 408–420 of FIG. 4, several different offline processing alternatives may be available to the speaker. For example, a speaker may be able to choose between two or more different levels of offline recognition with varying degrees of speed, accuracy, cost or other parameters. Similarly, the speaker may be able to choose among different offline transcription services having varying costs 1210 or turn-around times 1215. The offline options may be selected by the speaker explicitly on an individual basis, for example, by designating that a speech recognizor running on a particular hardware platform be used for offline recognition. Alternatively, the speaker may designate an importance 1220 (low, medium, high) or a cost ceiling (e.g., no more than $30 for offline processing) that would be used by a software-based offline selection process to choose the type and extent of offline processing to apply to a document.

Further, the speech recognition system may have default settings concerning the type and degree of offline processing to be performed on a particular document based on predetermined criteria 1225. For example, the real-time recognizor 303 may send the speech sample to the offline recognizor 309 automatically if the real-time recognizor's confidence level 1230 in the accuracy of its recognition results is less than a threshold value. Depending on the system administrator's goals, the speaker may or may not be able to vary or override the default settings.

Figure 7:
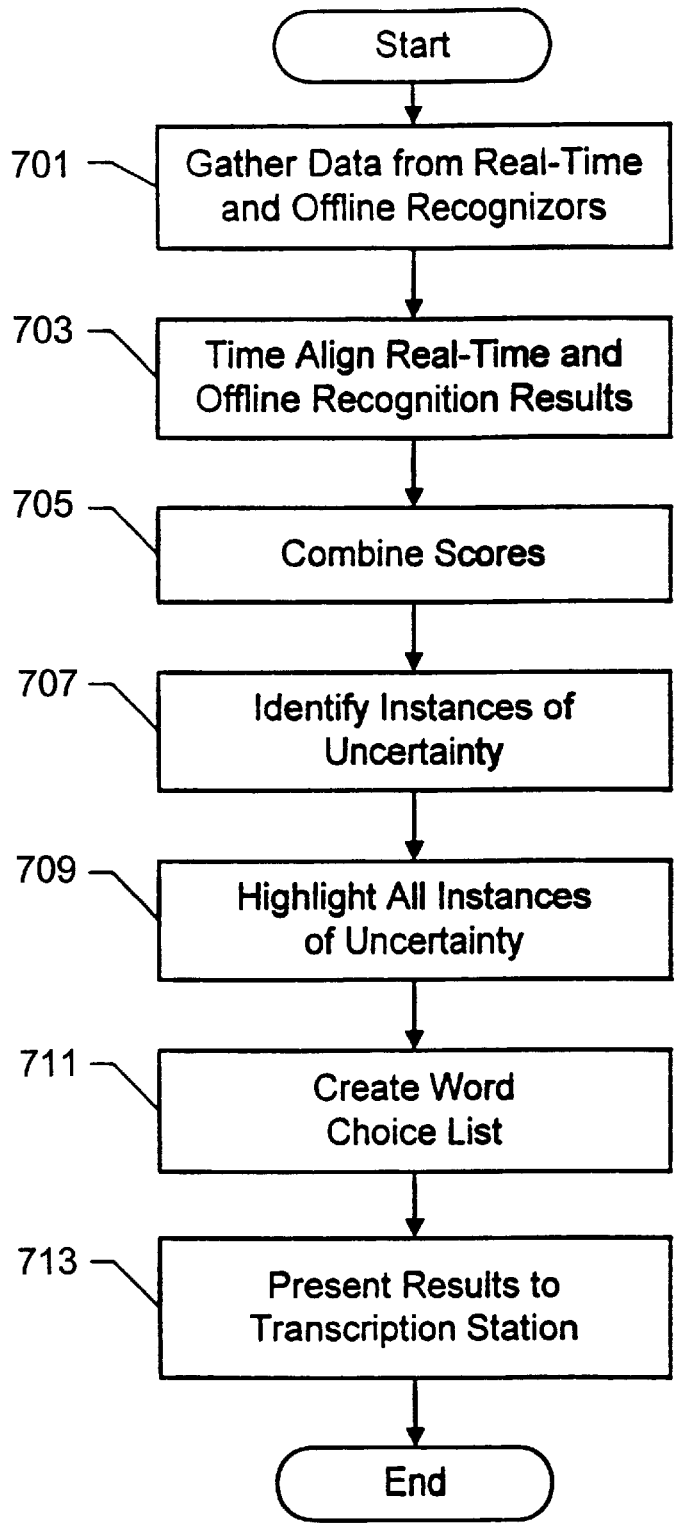
FIG. 7 is a flowchart of the operations performed by the combiner in the speech recognition system of FIG. 3.

A more detailed description of the processing that is performed by the combiner 311 and offline transcription station 313 in steps 412 and 416 of FIG. 4 is provided with reference to the flowchart of FIG. 7. The combiner's first step is to gather the recognition results from both the real-time recognizor and the offline recognizor (step 701). The combiner receives one or more candidates for each unit of input speech from the real-time recognizor and from the offline recognizor. If the combiner does not receive a score from each of the recognizors for a reported candidate, the combiner is not able to calculate a combined score for that candidate. Accordingly, if one of the recognizors has included a candidate that does not appear in the other recognizor's communicated results, the combiner will request and receive a score for that candidate from the non-reporting recognizor. Alternatively, the combiner may use a value slightly higher than the score of the worst-scoring candidate provided by the non-reporting recognizor.

Once the candidates and scores have been gathered, the combiner time aligns the tables to match corresponding speech units between the real-time recognition results and the offline recognition results (step 703). For example, an input speech unit which in fact represents the word "had" might have been recognized incorrectly by the real-time recognizor as "hat" while the offline recognizor recognized it correctly as "had." Accordingly, to properly generate a combined list of candidates and their respective scores for the speech unit, the combiner must time align the real-time recognizor's candidate, "hat," with the offline recognizor's candidate, "had," so that they correspond to the same speech unit. If, however, the two recognizors disagree for several speech units in a row, or if the recognizors disagree on how many speech units in fact were spoken during a given period of time, the combiner treats the disputed sequence of speech units as if the sequence were an atomic unit—that is, several successive candidates are concatenated together to form a single candidate which corresponds to several input speech units (i.e., an input phrase).

Once the two sets of recognition results have been time aligned, a combined score for each candidate is calculated using the equation set forth above (step 705). The particular value of $\lambda$ used by the combiner in calculating the combined scores depends on confidence levels that the combiner maintains for each of the recognizors. These confidence levels may be adapted over time as the combiner learns the types of speech that are better recognized by one recognizor or the other. Because the offline recognizor is optimized for high accuracy whereas the real-time recognizor is not, one might expect that the combiner would use a value of 1 for $\lambda$, thereby setting the combined score equal to the offline recognizor's score. If the primary purpose was to minimize the collective error rate of the recognizors, then a system administrator might choose to use a value of 1 for $\lambda$. To do so, however, would result in the loss of a large amount data—namely, the candidates and scores generated by the real-time recognizor—that potentially may be useful to the combiner or to the human transcriptionist or both. For example, if the offline recognizor's score for "hat" was 9 and 10 for "had" (i.e., a negligible difference) while the real-time recognizor scored "hat" as 5 and "had" as 55, the real-time values would have a considerable effect on the combined score depending on the value of $\lambda$. Accordingly, $\lambda$ typically is set to a value less than 1 to preserve the recognition results from the real-time recognizor for the offline transcriptionist. In this manner, the transcriptionist is provided with more word choices (i.e., word choices from both recognizors rather than just one or the other) and thus is more likely to make the correct word choice in correcting a recognition error.

Figure 13:
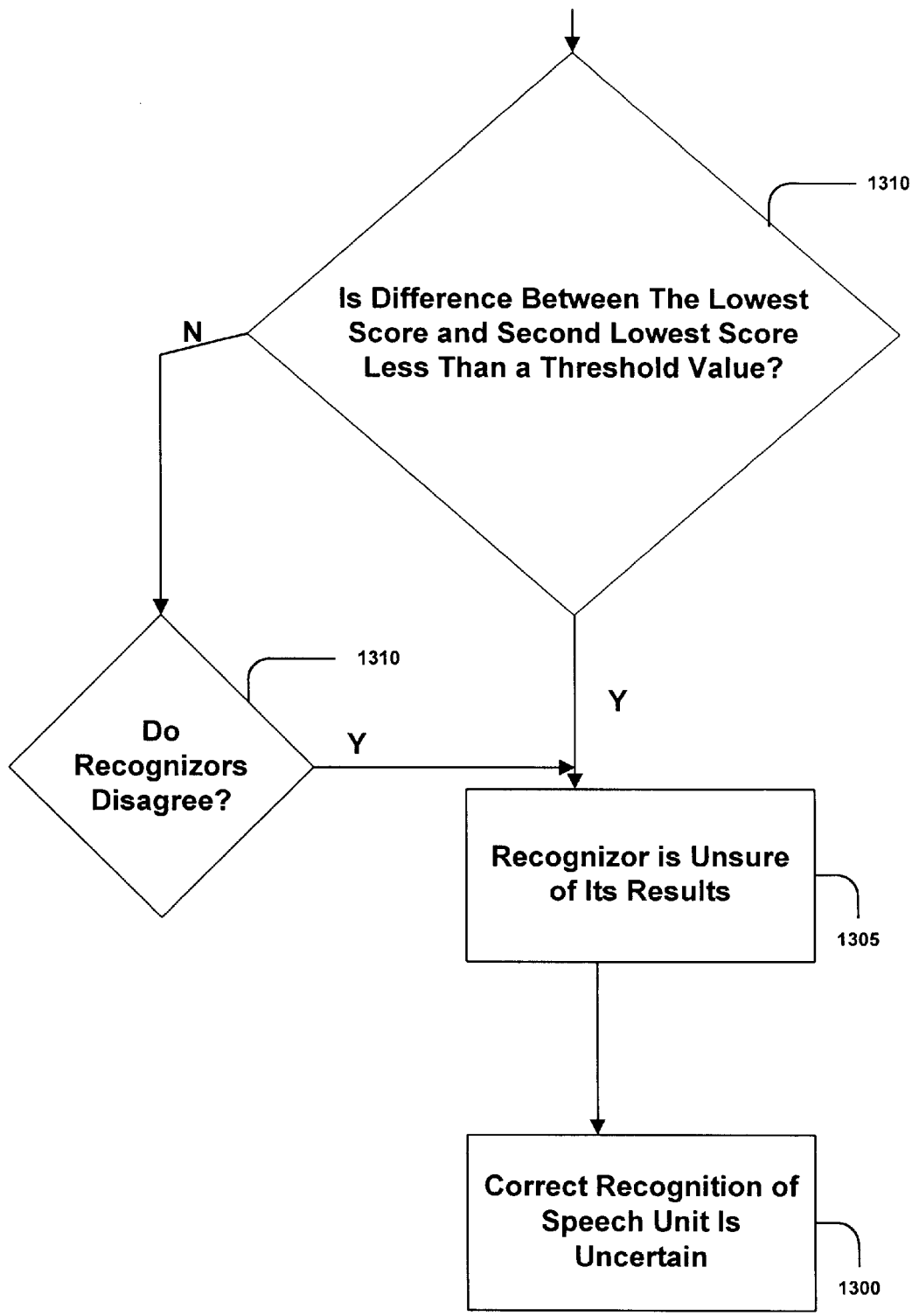
FIG. 13 is a diagram showing steps taken by a combiner to process recognition results.
Figure 3:
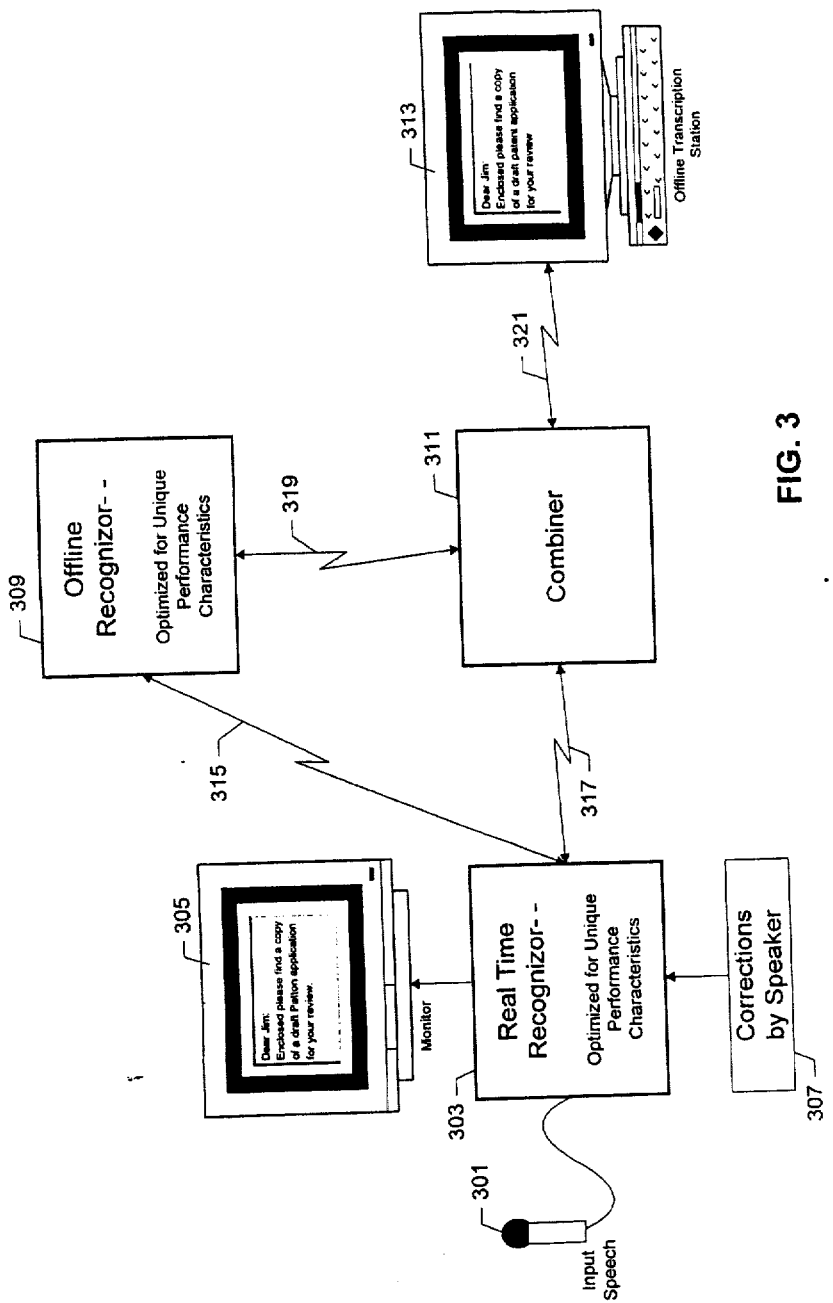
Figure 5:
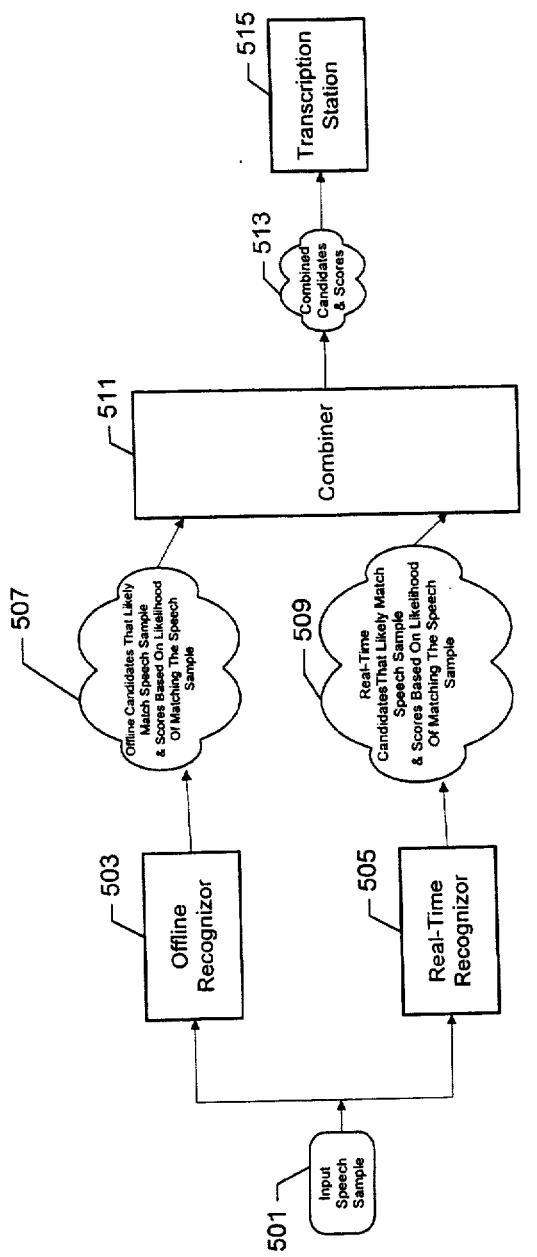

The combiner uses the combined scores to identify instances of uncertainty between the two recognizors about the correct recognition of a speech unit (step 707). Referring also to FIG. 13, the correct recognition of a speech unit is uncertain 1300 if (a) the real-time recognizor is unsure of its results 1305, (b) the offline recognizor is unsure of its results 1305, or (c) the two recognizors disagree 1310 (even if both are certain of their respective results). A recognizor is unsure of its results 1305 if the difference between the lowest score (best guess) and the second lowest score (second best guess) is less than a threshold value 1310.

The combiner may highlight each instance of uncertainty (e.g., using bold type face or reverse contrast) to identify the uncertainty to the transcriptionist when the corresponding text appears on the screen of the offline transcription station (step 709). In addition, the combiner generates a word list for each instance of uncertainty to be presented to the transcriptionist at the offline transcription station along with the highlighted instances of uncertainty (step 713).

FIGS. 8A–8C and 9 show a simplified example of speech recognition using the system of FIG. 3. In this example, the speaker has spoken the words "Dear Jim: [new paragraph] Enclosed please find a copy of a draft patent application for your review." As shown in the recognition results table for the real-time recognizor in FIG. 8A, the real-time recognizor's top four candidates for matching the thirteenth utterance are "Patton" with a score of 42, "patent" with a score of 43, "batten" with a score of 48, and "happened" with a score of 54. Because the real-time recognizor's lowest scoring candidate (i.e., its best guess) is "Patton," the real-time recognizor incorrectly recognizes the thirteenth utterance.

Assume in this example that the speaker has chosen to send the speech sample to the offline recognizor, which in response performs its recognition analysis and generates the results table shown in FIG. 8B. The offline recognizor's top four candidates for matching the thirteenth utterance are "patent" with a score of 11, "Patton" with a score of 47, "happened" with a score of 51, and "had" with a score of 64. After both recognizors have performed their respective recognition analyses, each sends its recognition results to the combiner for processing.

Upon receiving the two sets of recognition results, the combiner determines that the real-time recognizor has not provided a score for one of the offline recognizor's candidates ("had") and that the offline recognizor has not provided a score for one of the real-time recognizor's candidates ("batten"). Consequently, the combiner requests the recognizors to provide scores for the unscored candidates so that for each candidate the combiner will have two scores with which a combined score may be calculated. In this example, the real-time recognizor responds with a score of 55 for "had" and the offline recognizor responds with a score of 65 for "batten."

The combiner then generates a combined results table as shown FIG. 8C by determining the union of the real-time recognizors candidates and the offline recognizor's candidates. The corresponding combined score for each candidate is calculated using a value of $\lambda=0.75$ in this example, and the candidates are arranged in the combined results table in ascending order according to combined score.

The thirteenth utterance in the speech sample is identified as an instance of recognition uncertainty in this example for two independent reasons. First, the two recognizors disagreed on the recognition of the thirteenth utterance ("patent" versus "Patton"). Second, the difference between the scores for the real-time recognizor's first and second candidates was small (42 versus 43). Accordingly, the combiner marks the thirteenth utterance 905 as a recognition uncertainty, for example, by putting it in bold face and italics as shown in FIG. 9, thereby providing a dramatic indication to the transcriptionist that he or she should pay special attention to that utterance.

As shown in FIG. 9, the offline transcriptionist is presented with a transcription of the speech sample that recognizes "patent" as the thirteenth utterance because "patent" had the lowest combined score relative to the other candidates for that utterance. The transcriptionist also is presented with a word choice list 909 which lists all potential candidates in decreasing order of the probability that they are correct (equivalently, in increasing order of combined scores). The transcriptionist most likely would stay with the first choice 913 which corresponds to the word "patent," thereby confirming that the offline recognizor made the correct decision in the first instance. This confirmation may be used to adapt the respective speech models used by the real-time and offline recognizors.

By performing speech recognition in multiple stages as described above (i.e., real-time recognition, offline recognition, offline transcription), the recognition error rate is reduced to negligible levels. For example, in a speaker-independent continuous speech recognition system with short enrollment (i.e., minimal speech model training time), using a real-time recognizor alone results in a 10–15 percent recognition error rate. If the speech is further recognized by an offline recognizor, the cumulative recognition error rate drops to about 5–10 percent. The use of a human transcriptionist to further process the input speech reduces the recognition error rate to about 1 percent or less.

The methods and mechanisms described here are not limited to any particular hardware or software configuration, but rather they may find applicability in any computing or processing environment that may be used for speech recognition.

The techniques described here may be implemented in hardware or software, or a combination of the two. Preferably, the techniques are implemented in computer software executing on programmable computers that each include at least a processor, a storage medium readable by the processor (including volatile and non-volatile memory and/or storage elements), a suitable input device, and suitable output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or an interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A computer-based method of speech recognition comprising:

receiving a speech sample;

processing the speech sample with a first speech recognizor running on a first processor and at least a second speech recognizor running on a second processor, the speech recognizors having different performance characteristics;

wherein the processing by the first speech recognizor comprises real-time continuous speech recognition; and recognizing speech content of the speech sample based on the processing by the speech recognizors.

2. The method of claim 1 in which the first and second speech recognizors are optimized for their respective performance characteristics.

3. The method of claim 2 in which the optimized characteristic for the first speech recognizor comprises real-time responsiveness.

4. The method of claim 3 in which the optimized characteristic for the second speech recognizor comprises recognition accuracy.

5. The method of claim 1 in which the performance characteristics are based on style.

6. The method of claim 1 in which the performance characteristics are based on subject matter.

7. The method of claim 1 in which the processing by the first speech recognizor comprises real-time processing.

8. The method of claim 7 in which the processing by the second speech recognizor comprises offline processing.

9. The method of claim 1 in which the processing comprises performing a first recognition analysis with the first speech recognizor and a second recognition analysis with the second speech recognizor in parallel.

10. The method of claim 1 in which the processing comprises performing a first recognition analysis with the first speech recognizor and a second recognition analysis with the second speech recognizor serially.

11. The method of claim 1 in which the processing by the first speech recognizor further comprises providing a real-time text display corresponding to the speech sample.

12. The method of claim 1 in which the processing by the second speech recognizor comprises performing large vocabulary continuous speech recognition on the speech sample.

13. The method of claim 1 in which the processing comprises:

the first speech recognizor identifying a first set of candidates that likely match the speech sample and calculating a corresponding first set of scores, the scores based on a likelihood of matching the speech sample; and the second speech recognizor identifying a second set of candidates that likely match the speech sample and calculating a corresponding second set of scores, the scores based on a likelihood of matching the speech sample.

14. The method of claim 13 in which the processing further comprises:

combining the first set of candidates and the second set of candidates to generate a combined set of candidates; and merging the first set of scores and the second set of scores to generate a combined set of scores.

15. The method of claim 14 in which the combining comprises finding the union of the first and second sets of candidates.

16. The method of claim 14 in which the merging comprises calculating a weighted average from corresponding pairs of scores in the first and second sets of scores.

17. The method of claim 14 further comprising presenting the combined set of candidates to a transcriptionist in an order of priority determined by the candidates' respective combined scores.

18. The method of claim 13 further comprising determining, for each set of candidates, that a recognition uncertainty exists if a difference between a score for a best scoring candidate and a score for a second best scoring candidate is less than a threshold value.

19. The method of claim 1 further comprising presenting results of the processing to a transcriptionist at a second computer.

20. The method of claim 1 in which the recognizing comprises receiving feedback from a transcriptionist regarding whether the speech content was correctly recognized.

21. The method of claim 20 further comprising adapting speech models used by the first and second speech recognizors based on the feedback received from the transcriptionist.

22. The method of claim 1 further comprising determining whether a recognition uncertainty exists based on the processing by the first and second speech recognizors.

23. The method of claim 22 further comprising identifying a recognition uncertainty to a transcriptionist.

24. The method of claim 22 in which a recognition uncertainty is determined to exist if a recognition result from the first speech recognizor disagrees with a recognition result from the second speech recognizor.

25. A computer-based method of speech recognition comprising:

receiving a speech sample;

processing the speech sample with a first speech recognizor, the first speech recognizor providing interactive, real-time, continuous speech recognition;

selectively performing offline, non-interactive, non-real-time processing of the speech sample using a second speech recognizor; and recognizing speech content of the speech sample based on the processing by the speech recognizors.

26. The method of claim 25 in which the selective performing comprises deciding whether to perform offline processing based on input from a human operator.

27. The method of claim 25 in which the selective performing comprises deciding whether to perform offline processing based on predetermined criteria.

28. The method of claim 27 in which the predetermined criteria comprise costs associated with offline processing.

29. The method of claim 27 in which the predetermined criteria comprise processing times associated with offline processing.

30. The method of claim 27 in which the predetermined criteria comprise a confidence level of recognition results from the first speech recognizor.

31. The method of claim 27 in which the predetermined criteria comprise an importance level associated with the speech sample.

32. The method of claim 25 in which the offline processing includes the processing by the second speech recognizor.

33. The method of claim 25 in which the offline processing comprises recognition error correction by a transcriptionist.

34. A computer-based method of speech recognition comprising:

receiving a speech sample;

processing the speech sample with at least two speech recognizors, each of which is optimized for a different recognition characteristic;

comparing results of the processing by the recognizors; and determining that a recognition uncertainty exists when a best result produced by a first recognizor differs from a best result produced by a second recognizor.

35. The method of claim 34 further comprising identifying a portion of the speech sample as corresponding to the recognition uncertainty.

36. The method of claim 34 further comprising presenting an indicator of the recognition uncertainty to a transcriptionist.

37. A speech recognition system comprising:

an input device configured to receive a speech sample to be recognized;

a first speech recognizor, coupled to the input device, for performing speech recognition on the speech sample;

at least one other speech recognizor, coupled to the first speech recognizor, for performing offline, non-interactive, non-real-time speech recognition on the speech sample; and a processor configured to receive and process recognition results from the speech recognizors.

38. The speech recognition system of claim 37 in which the first and second characteristics comprise complementary properties.

39. The speech recognition system of claim 37 in which the first characteristic comprises real-time responsiveness.

40. The speech recognition system of claim 39 in which the second characteristic comprises high recognition accuracy.

41. The speech recognition system of claim 37 further comprising a computer system for controlling the first recognizor, the computer system comprising a graphic user interface for interacting with a user.

42. The speech recognition system of claim 41 in which the graphic user interface allows the user to revise a recognition result from the first speech recognizor.

43. The speech recognition system of claim 41 in which the graphic user interface allows the user to selectively restrict the speech sample from being transmitted to the at least one other speech recognizor.

44. The speech recognition system of claim 41 further comprising a transcription station, and in which the graphic user interface allows the user to selectively transmit the speech sample to the transcription station.

45. The speech recognition system of claim 30 further comprising a transcription station, coupled to the processor, for use by a transcriptionist to correct recognition errors.

46. A computer-based method of speech recognition comprising:

receiving a speech sample;

processing the speech sample with a first speech recognizor running on a first processor;

determining whether a predetermined criterion based on input from a user is satisfied;

transmitting the speech sample to a second speech recognizor running on a second processor for additional processing only if the predetermined criterion is satisfied; and if the predetermined criterion is not satisfied, outputting results of the processing with the first speech recognizor without transmitting the speech sample to the second recognizor.

47. A computer-based method of speech recognition comprising:

receiving a speech sample;

processing the speech sample with a first speech recognizor running on a first processor;

determining whether a predetermined criterion based on a document type associated with the speech sample is satisfied;

transmitting the speech sample to a second speech recognizor running on a second processor for additional processing only if the predetermined criterion is satisfied; and if the predetermined criterion is not satisfied, outputting results of the processing with the first speech recognizor without transmitting the speech sample to the second recognizor.

48. A computer-based method of speech recognition comprising:

receiving a speech sample;

processing the speech sample with a first speech recognizor running on a first processor;

determining whether a predetermined criterion based on a cost associated with the second speech recognizor is satisfied;

transmitting the speech sample to a second speech recognizor running on a second processor for additional processing only if the predetermined criterion is satisfied; and if the predetermined criterion is not satisfied, outputting results of the processing with the first speech recognizor without transmitting the speech sample to the second recognizor.

49. A computer-based method of speech recognition comprising:

receiving a speech sample;

processing the speech sample with a first speech recognizor running on a first processor and at least a second speech recognizor running on a second processor, the speech recognizors having different performance characteristics; and recognizing speech content of the speech sample based on the processing by the speech recognizors;

wherein the processing comprises:

the first speech recognizor identifying a first set of candidates that likely match the speech sample and calculating a corresponding first set of scores, the scores based on a likelihood of matching the speech sample; and the second speech recognizor identifying a second set of candidates that likely match the speech sample and calculating a corresponding second set of scores, the scores based on a likelihood of matching the speech sample.

50. A computer-based method of speech recognition comprising:

receiving a speech sample;

processing the speech sample with a first speech recognizor running on a first processor and at least a second speech recognizor running on a second processor, the speech recognizors having different performance characteristics;

recognizing speech content of the speech sample based on the processing by the speech recognizors;

determining whether a recognition uncertainty exists based on the processing by the first and second speech recognizors; and identifying a recognition uncertainty to a transcriptionist.

51. A computer-based method of speech recognition comprising:

receiving a speech sample;

processing the speech sample with a first speech recognizor running on a first processor and at least a second speech recognizor running on a second processor, the speech recognizors having different performance characteristics; and recognizing speech content of the speech sample based on the processing by the speech recognizors; and determining whether a recognition uncertainty exists based on the processing by the first and second speech recognizors, wherein the recognition uncertainty is determined to exist if a recognition result from the first speech recognizor disagrees with a recognition result from the second speech recognizor.

* * * * *

UNITED STATES PATENT AND TRADEMARK OFFICE
CERTIFICATE OF CORRECTION

PATENT NO : 6,122,613

DATED : September 19, 2000

INVENTOR(S): BAKER, James K.

It is certified that error appears in the above-identified patent and that said Letters Patent is hereby corrected as shown below:

Figures 3 and 5 should be replaced with Figures 3 and 5, which were submitted during prosecution and which were approved by the Examiner.

Signed and Sealed this

Twenty-fourth Day of April, 2001

Attest:

NICHOLAS P. GODICI

Attesting Officer

Acting Director of the United States Patent and Trademark Office